(12) United States Patent
Jo et al.

(10) Patent No.: US 11,492,499 B2
(45) Date of Patent: Nov. 8, 2022

(54) COMPOSITE RESIN COMPOSITION FOR STEEL PLATE FOR FUEL TANK, COMPOSITE RESIN-COATED STEEL PLATE USING SAME, AND MANUFACTURING METHOD THEREFOR

(71) Applicant: POSCO, Pohang-si (KR)

(72) Inventors: Du-Hwan Jo, Pohang-si (KR); Sung-Kyu Kim, Gwangyang-si (KR)

(73) Assignee: POSCO, Gyeongsangbuk-Do (KR)

( * ) Notice: Subject to any disclaimer, the term of this patent is extended or adjusted under 35 U.S.C. 154(b) by 613 days.

(21) Appl. No.: 16/349,012

(22) PCT Filed: Nov. 14, 2017

(86) PCT No.: PCT/KR2017/012884
§ 371 (c)(1),
(2) Date: May 10, 2019

(87) PCT Pub. No.: WO2018/088876
PCT Pub. Date: May 17, 2018

(65) Prior Publication Data
US 2019/0270894 A1    Sep. 5, 2019

(30) Foreign Application Priority Data

Nov. 14, 2016  (KR) .................. 10-2016-0151277

(51) Int. Cl.
| | |
|---|---|
| *C09D 5/08* | (2006.01) |
| *C09D 7/65* | (2018.01) |
| *C09D 175/04* | (2006.01) |
| *C22C 38/04* | (2006.01) |
| *C22C 38/06* | (2006.01) |
| *C08L 85/02* | (2006.01) |
| *C08K 3/34* | (2006.01) |
| *C25D 3/22* | (2006.01) |
| *C25D 3/66* | (2006.01) |
| *C09D 133/00* | (2006.01) |
| *C09D 163/00* | (2006.01) |
| *C08K 5/54* | (2006.01) |
| *C08K 5/00* | (2006.01) |
| *B05D 7/14* | (2006.01) |
| *C08K 5/5399* | (2006.01) |

(52) U.S. Cl.
CPC ................ *C09D 5/084* (2013.01); *C08K 3/34* (2013.01); *C08K 5/0091* (2013.01); *C08K 5/54* (2013.01); *C08L 85/02* (2013.01); *C09D 5/08* (2013.01); *C09D 5/082* (2013.01); *C09D 7/65* (2018.01); *C09D 133/00* (2013.01); *C09D 163/00* (2013.01); *C09D 175/04* (2013.01); *C22C 38/04* (2013.01); *C22C 38/06* (2013.01); *C25D 3/22* (2013.01); *C25D 3/66* (2013.01); *B05D 7/14* (2013.01); *C08K 5/5399* (2013.01)

(58) Field of Classification Search
CPC . C09D 5/082; C09D 5/084; C09D 5/08–5/12; C09D 185/02; B05D 7/16; C08L 85/02
USPC .......................................... 106/14.05–14.45
See application file for complete search history.

(56) References Cited

U.S. PATENT DOCUMENTS

| | | | | |
|---|---|---|---|---|
| 5,639,808 | A * | 6/1997 | Coggio ................ | C08K 5/5399 428/378 |
| 2003/0187107 | A1* | 10/2003 | Sumiyoshi .............. | C08L 63/00 524/95 |
| 2013/0158149 | A1* | 6/2013 | Kanagawa ......... | C08G 18/7642 522/33 |
| 2013/0306357 | A1 | 11/2013 | Hsu et al. | |
| 2016/0333137 | A1* | 11/2016 | Pan ......................... | B32B 15/00 |
| 2017/0260367 | A1* | 9/2017 | Liu ............................ | C08J 5/10 |

FOREIGN PATENT DOCUMENTS

| | | | |
|---|---|---|---|
| CN | 103182831 | | 7/2013 |
| CN | 104293111 | | 1/2015 |
| CN | 105820724 | | 8/2016 |
| EP | 3239336 | | 11/2017 |
| JP | 08183144 | | 7/1996 |
| KR | 20030023388 | | 3/2003 |
| KR | 20150075000 | | 7/2015 |
| KR | 101569509 | | 11/2015 |
| KR | 101630974 | | 6/2016 |
| KR | 20160067278 | | 6/2016 |
| KR | 20160070310 | | 6/2016 |
| KR | 101637129 | * | 7/2016 ........... C09D 175/04 |
| SU | 757577 | * | 8/1980 |

OTHER PUBLICATIONS

Full translation of SU 757577 into English (no date).*
Chinese Office Action—Chinese Application No. 201780070387.X dated Jul. 31, 2020, citing CN 104293111, US 2013/0306357, CN 105820724, and CN 103182831.
International Search Report—PCT/KR2017/012884 dated Mar. 26, 2018.
Suryatama, et al., An Approach for Developing Lightweight Steel Fuel Tanks for Plug-In Hybrid Electric Vehicles (PHEV),Strategic Alliance for Steel Fuel Tanks, www.sasft.org.
Takagi, et al., Development of Exhaust and Evaporative Emissions Systems for Toyota THS II Plug-in Hybrid Electric Vehicle, SAE Int. J. Fuels Lubr., 2010, pp. 406-413.

* cited by examiner

*Primary Examiner* — Marc S Zimmer
(74) *Attorney, Agent, or Firm* — Cantor Colburn LLP

(57) ABSTRACT

Provided is a composite resin composition for steel plates for a fuel tank, including: 30 to 65% by weight of a polymer resin; 1 to 15% by weight of a curing agent; 2 to 20% by weight of a corrosion-resistant additive; 1 to 15% by weight of an adhesion promoting agent comprising a polyphosphazene polymer compound; and a residual solvent. A composite resin-coated steel plate for a fuel tank, and a manufacturing method for a composite resin-coated steel plate are provided.

20 Claims, 4 Drawing Sheets

| COMPOSITION | INVENTIVE EXAMPLE 10 | INVENTIVE EXAMPLE 20 | INVENTIVE EXAMPLE 30 | COMPARATIVE EXAMPLE 2 |
|---|---|---|---|---|
| DETERIORATED GASOLINE | | | | |
| DETERIORATED DIESEL | | | | |

COMPOSITE RESIN COMPOSITION FOR STEEL PLATE FOR FUEL TANK, COMPOSITE RESIN-COATED STEEL PLATE USING SAME, AND MANUFACTURING METHOD THEREFOR

TECHNICAL FIELD

The present disclosure relates to a composite resin composition for a steel plate for a vehicle fuel tank, in particular, a hybrid vehicle fuel tank, a composite resin-coated steel plate for a fuel tank using the same, and a manufacturing method for the same.

BACKGROUND ART

In general, a material applied to the vehicle fuel tank is required to have relatively good safety, heat resistance, durability, and fuel permeability resistance properties, a relatively high degree of design freedom, and characteristics suitable for lightweight vehicles. As a steel plate for a conventional internal combustion engine fuel tank, a steel plate, plated employing a hot-dip plating method (for example, an Al—Si-based method, an Sn—Zn-based method, or the like), an electroplating method (for example, Zn—Ni-based method, or the like), or the like, may mainly be used.

In the meantime, as a hybrid vehicle fuel tank, which has seen rapid market growth recently, relatively expensive lining-treated plastics are used in amounts of 80% or more thereof, and steel materials are used in amounts of about 20% thereof.

A hybrid vehicle has a more complicated shape due to restriction of space for installing the fuel tank by the mounting of a battery in the vehicle, and, therefore, is required to have a material having relatively excellent moldability.

In recent years, a plug-in-hybrid vehicle, among hybrid vehicles, has attracted the most attention. A fuel tank applied thereto has a relatively large internal pressure difference (approximately $\Delta P=20$ to 30 kPa), when power is switched from fuel to an electric furnace. Therefore, a steel material having a thickness of 1.6 mm, which may be a relatively thick steel plate, or a relatively expensive multiple lining-treated plastic, has been used therefor.

As described above, since such materials, for example, a thick steel plate or an expensive plastic are used as a material for a hybrid vehicle fuel tank, there may be a disadvantage that it is difficult to reduce the fuel costs by reducing weight of the vehicle, and to reduce production costs thereof.

Therefore, it is necessary to develop a material capable of replacing the above-mentioned materials, for example, a thick steel plate or an expensive plastic, and reducing weight of the vehicle and production costs thereof.

PRIOR ART DOCUMENT(S)

(Non-Patent Document 1) Development of Exhaust and Evaporative Emissions Systems for Toyota THS II Plug-in Hybrid Electric Vehicle Toyota Motor Corporation, 2010-01-0831, SAE International (Non-Patent Document 2) An Approach for Developing Lightweight Steel Fuel Tanks for Plug-In Hybrid Electric Vehicles (PHEV), SASFT (Strategic Alliance for Steel Fuel Tanks, www.sasft.org)

DISCLOSURE

Technical Problem

An aspect of the present disclosure is to provide a material for a hybrid vehicle fuel tank, in particular, a composite resin composition for a steel plate for a vehicle fuel tank, capable of replacing a thick steel plate or an expensive plastic, which have been conventionally used, and capable of providing a composite resin-coated steel plate for a fuel tank having relatively high strength and relatively high elongation properties; a composite resin-coated steel plate for a fuel tank using the same; and a manufacturing method for the same.

Technical Solution

According to an aspect of the present disclosure, a composite resin composition for steel plates for a fuel tank includes 30 to 65% by weight of a polymer resin; 1 to 15% by weight of a curing agent; 2 to 20% by weight of a corrosion-resistant additive; 1 to 15% by weight of an adhesion promoting agent comprising a polyphosphazene polymer compound; and a residual solvent.

According to another aspect of the present disclosure, a composite resin-coated steel plate for a fuel tank includes a steel plate; a plated layer formed on at least one surface of the steel plate; and a composite resin-coated layer formed on the plated layer, wherein the composite resin-coated layer comprises 40 to 85% by weight of a polymer resin, 3 to 20% by weight of a curing agent, 5 to 25% by weight of a corrosion-resistant additive, and 3 to 20% by weight of an adhesion promoting agent comprising a polyphosphazene polymer compound, wherein the steel plate has a tensile strength of 800 MPa or more and an elongation of 35% or more.

According to another aspect of the present disclosure, a manufacturing method fora composite resin-coated steel plate includes preparing a steel plate; forming a plated layer on at least one surface of the steel plate; applying a composite resin composition for a fuel tank steel plate to an upper portion of the plated layer; and drying the applied composite resin composition at a temperature of 120 to 200° C., wherein the composite resin composition fora fuel tank steel plate includes 30 to 65% by weight of a polymer resin; 1 to 15% by weight of a curing agent; 2 to 20% by weight of a corrosion-resistant additive; 1 to 15% by weight of an adhesion promoting agent comprising a polyphosphazene polymer compound; and a residual solvent.

Advantageous Effects

According to an aspect of the present disclosure, a composite resin-coated steel plate suitable as a material for a hybrid vehicle fuel tank, which is required to be excellent in terms of corrosion resistance and fuel resistance, and to be excellent in terms of moldability to be molded into a more complicated shape, may be provided.

In addition, the composite resin-coated steel plate of the present disclosure may replace a thick steel plate, an expensive plastic, or the like, which have been conventionally used as a material fora hybrid vehicle fuel tank, and may reduce weight of the vehicle and production costs thereof at the same time.

BEST MODE FOR INVENTION

A steel plate to be used in the present disclosure may generally be a high elongation steel plate having an elongation of 35% or more, and preferably 50% or more. In the present disclosure, a high-manganese steel plate may be used as an example of such a steel plate, but is not necessarily limited thereto.

At present, conventional carbon steel or soft interstitial free (IF) steel may mainly be used in a steel plate for a vehicle fuel tank, but these steels do not exhibit an elongation of 45% or more even though they have excellent ductility.

Figure 1:
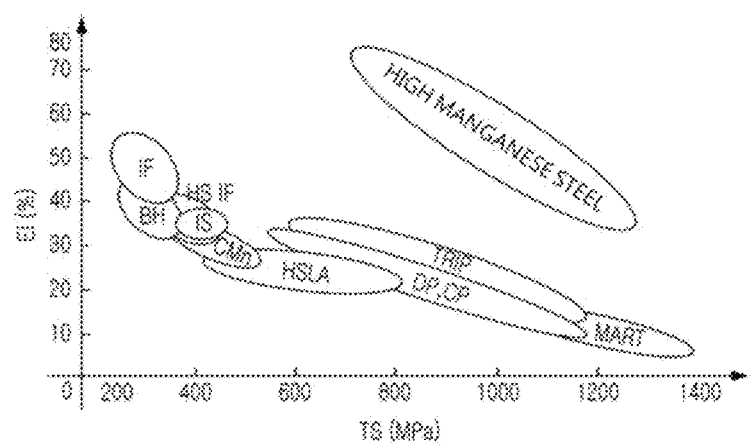
FIG. 1 illustrates a relationship between tensile strength (TS) and elongation (El) for each steel type.

A high-manganese cold-rolled steel plate having a manganese content of about 12 wt % in a steel alloy composition or more and having an austenite structure may have a twin structure at the time of deformation to have characteristics showing a strength of 800 MPa or more and a ductility of 50% or more (FIG. 1).

In order to replace the expensive plastic used as the material for the hybrid vehicle fuel tank, a material having a ductility of 35% or more, more preferably 50% or more, may be required. In this connection, it can be confirmed that the above-mentioned manganese cold-rolled steel plate is suitable as a material for a hybrid vehicle fuel tank.

When a steel plate having relatively high strength and relatively high ductility is used, corrosion resistance thereof may be relatively low only by itself. Therefore, there may be a limit to using a material for a fuel tank, particularly a panel.

Therefore, the present disclosure may adopt a high-elongation steel plate having an elongation of 35% or more, and preferably 50% or more, more preferably a high-manganese cold-rolled steel plate as a material for a hybrid vehicle fuel tank, (For example, electroplating or hot-dip coating) may be performed for improvement, and may further perform a composite resin coating operation to impart lubrication and relatively high corrosion resistance.

The present disclosure may have technical significance in providing a composite resin composition having a novel composition, to improve moldability of the composite resin-coated layer itself as well as adhesion between the coating layer and the composite resin-coated layer, formed on the high-manganese cold-rolled steel plate.

Hereinafter, the present disclosure will be described in detail.

The composite resin composition for steel plates for a fuel tank according to an aspect of the present disclosure comprises 30 to 65% by weight of a polymer resin; 1 to 15% by weight of a curing agent; 2 to 20% by weight of a corrosion-resistant additive; 1 to 15% by weight of an adhesion promoting agent comprising a polyphosphazene polymer compound; and a residual solvent.

A temperature of fuel in the fuel tank may rise to 90° C. or higher, when the vehicle is traveling. The polymer resin may be characterized by having excellent heat resistance and chemical resistance to the fuel.

The polymer resin is preferably one or more selected from urethane, acrylic, ester and epoxy copolymer urethane having a number average molecular weight of 5,000 to 50,000 and a Tg of 10 to 50° C. A molecular structure of the polymer resin may include a chain type group, a cross-linking type group, or an aromatic group.

The polymer resin is preferably included in an amount of 30 to 65% by weight of the entire composition. When the content is less than 30% by weight, the ductility of the coated layer may be insufficient to deteriorate the workability. When the content exceeds 65% by weight, the hardness of the coated layer may be lowered due to a low degree of curing, and the coated layer may be moved during processing.

The curing agent may react with the polymer resin to form a dense three-dimensional network structure, thereby ensuring excellent fuel resistance and corrosion resistance.

As the curing agent, one or more of a melamine-based curing agent, an amine-based curing agent such as arzidine, and an isocyanate curing agent, having excellent reactivity, are preferable.

The melamine-based curing agent in the curing agent is preferably one or more selected from melamine, butoxymethyl melamine, hexamethoxymethyl melamine, and trimethoxymethyl melamine. As the isocyanate curing agent, a compound having a structure of R—N=C=O (wherein R is —$CH_3$, —$CH_2CH_3$, —$CH_2CH_2CH_3$, or -Ph) may be used.

The curing agent is preferably contained in an amount of 1 to 15% by weight. When the content of the curing agent is less than 1% by weight, the curing reaction of the composite resin-coated layer during a dry coating operation may not be completed, to deteriorate physical properties of the coated layer. When the content exceeds 15% by weight, the hardness of the coated layer may become excessively high, causing a deterioration of workability.

The corrosion-resistant additive may be a component for improving the corrosion resistance of the composite resin-coated layer, and is preferably added in a combination of a silicate compound and a titanium compound. Specifically, the corrosion-resistant additive is preferably added as a mixture of the silicate compound and the titanium compound.

The silicate compound is preferably one or more of lithium polysilicate, sodium polysilicate, potassium polysilicate, and colloidal silica, but is not limited thereto.

The content of the silicate compound is preferably 1 to 12 wt %. When the content of the silicate compound is less than 1% by weight, the effect of improving corrosion resistance may be insufficient. When the content of the silicate compound exceeds 12% by weight, the corrosion resistance may be improved, but a surface of the coated layer may be roughened to deteriorate the workability.

The titanium compound is preferably at least one of titanium carbonate, isopropyl ditriethanol aminotitanate, titanium lactic acid chelate, and titanium acetylacetonate, but is not limited thereto.

The titanium compound may have the effect of improving the corrosion resistance of the processed portion even when added in a relatively small amount, and the titanium compound is preferably contained in an amount of 1 to 8% by weight. When the content of the titanium compound is less than 1% by weight, the effect of improving corrosion resistance may be insignificant. When the content of the titanium compound exceeds 8% by weight, production costs may undesirably increase.

As described above, in the case that the mixture of the silicate compound and the titanium compound is added, the silicate compound and the titanium compound is preferably added in a weight ratio of 0.5:1 to 4:1. When the weight ratio is satisfied, the effect to be obtained in each compound may be sufficiently acquired.

The adhesion promoting agent is preferably a polymer compound capable of bonding to metal of the plated layer, to improve the adhesion between the composite resin-coated layer and the plated layer. As such a polymer compound, it is preferable to add a polyphosphazene polymer compound. The polyphosphazene polymer compound may have a property of strongly binding to an M (metal)-OH bond on the surface of the plated layer having metals, such that the adhesion of the composite resin-coated layer may be greatly improved.

Figures 3, 4:
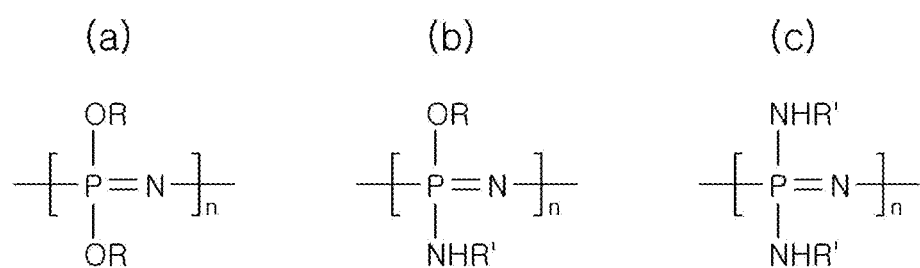
FIG. 3 illustrates a formula of polyphosphazene polymer compounds according to an embodiment of the present disclosure.
FIG. 4 shows evaluation results of fuel resistance in inventive examples according to an embodiment of the present disclosure, and a comparative example.

The polyphosphazene polymer compound preferably has a number average molecular weight of 5,000 to 50,000 and have one or more functional groups. The substitution functional groups are preferably one or more of alkyl, substituted alkyl, aryl, and substituted aryl (FIG. 3). The alkyl and substituted alkyl preferably has 1 to 10 carbon atoms, the aryl and substituted aryl preferably have 1 to 5 carbon atoms, and the substituted aryl may be those substituted with a halogen element, or an alkoxy group having 1 to 4 carbon atoms.

The adhesion promoting agent is preferably included in an amount of 1 to 15% by weight. When the content of the adhesion promoting agent is less than 1% by weight, the effect of improving adhesion may be insufficient to deteriorate a blackening property of the processing during deep processing. When the content exceeds 15% by weight, the adhesion may be improved, but the viscosity of the solution may excessively increase to deteriorate workability.

A remaining component, except for the above-mentioned components, may be a solvent. The solvent is not particularly limited, but water is preferably used in consideration of workability and environmental properties. Water refers to deionized water or distilled water.

Hereinafter, a composite resin-coated steel plate for a fuel tank according to another aspect of the present disclosure, and a method of manufacturing the same will be described in detail.

The composite resin-coated steel plate for a fuel tank includes a steel plate; a plated layer formed on at least one surface of the steel plate; and a composite resin-coated layer formed on the plated layer, wherein the composite resin-coated layer is preferably a composite resin composition according to the present disclosure.

The composite resin-coated layer preferably includes 40 to 85% by weight of a polymer resin, 3 to 20% by weight of a curing agent, 5 to 25% by weight of a corrosion-resistant additive, and 3 to 20% by weight of an adhesion promoting agent.

Preferably, the corrosion-resistant additive may include 3 to 15% by weight of a silicate compound and 2 to 10% by weight of a titanium compound.

The composite resin-coated layer may be a coated layer on which the composite resin composition described above is dried, and corresponds to a component remaining after the volatile substances contained in the composite resin-coated layer are all volatilized. Therefore, the composite resin-coated layer may not include water as a solvent, and may not include water contained in a polymer resin, adhesion promoting agent, or the like. Therefore, the components included in the composite resin-coated layer correspond to the content based on 100 wt % of the total solid content.

The steel plate, for example, the steel plate for forming the plated layer (also referred to as a "base steel plate") may be a high manganese cold-rolled steel plate having a manganese (Mn) content of 12 wt % or more. In the present disclosure, the high-manganese cold-rolled steel plate is not particularly limited as long as it is a steel plate containing manganese in the above-mentioned content, and having relatively high strength (tensile strength of 800 MPa or more) and relatively high ductility (elongation of 35% or more).

As an example, the high-manganese cold-rolled steel plate including, by weight, 0.2 to 1.0% of carbon (C), 12 to 20% of manganese (Mn), 0.5 to 2.5% of solid solution aluminum (S—Al), residual iron (Fe), and other unavoidable impurities, may be applied, and may further include elements which may be advantageous for improving mechanical properties, for example, silicon (Si), chrome (Cr), nickel (Ni), etc., in addition to the above-described alloy components.

The plated layer formed on one surface of the above-described steel plate is preferably an electroplated layer or a hot-dip plated layer.

The electroplated layer is preferably a zinc plated layer or a zinc-nickel alloy plated layer, and the hot-dip plated layer is preferably one of a hot-dip zinc plated layer, an alloyed hot-dip zinc plated layer, a zinc-aluminum-magnesium alloy plated layer, and an aluminum-silicon alloy plated layer.

The electroplated layer is preferably formed with a single surface adhesion amount of 5 to 40 $g/m^2$, and the hot-dip plated layer is preferably formed with a single surface adhesion amount of 20 to 60 $g/m^2$. In this case, when the single surface adhesion amount is excessively low, depending on the plating method, improvements of corrosion resistance of the composite resin-coated steel plate may be insufficient. When the coating amount is excessively high, the plated layer may be formed to be relatively thick to deteriorate weldability, and the like.

More preferably, the plated layer may be a zinc-nickel alloy electroplated layer produced by a zinc (Zn)-nickel (Ni) alloy electroplating method. In this case, the nickel content in the zinc-nickel alloy electroplated layer is preferably 5 to 15% by weight.

Figure 2:
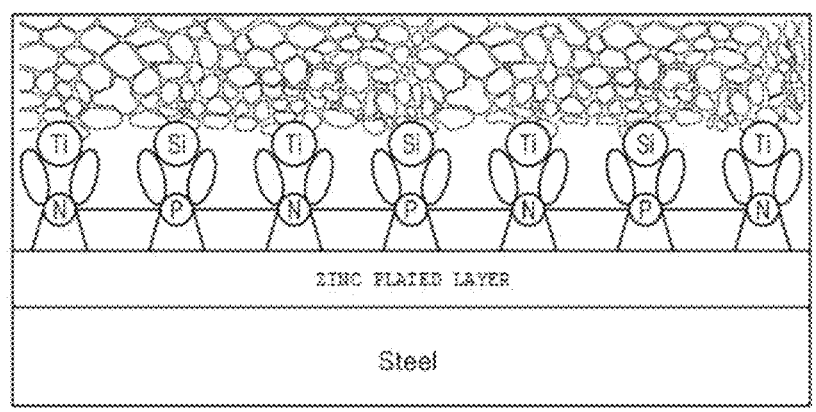
FIG. 2 is a schematic cross-sectional view illustrating a composite resin-coated steel plate according to an embodiment of the present disclosure.
Figure 2:
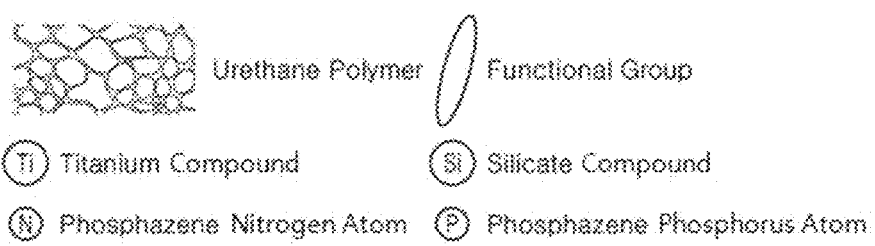

The composite resin-coated layer formed on the above-mentioned plated layer may have the cross-sectional structure as illustrated in FIG. 2. In this case, it is preferable that the weight ratio {([Si]+[Ti])/[P]} between Si, Ti, and P satisfies 0.5 to 1.5. When the weight ratio is less than 0.5, self-healing properties of the composite resin-coated layer may be insufficient. When the weight ratio is more than 1.5, the adhesion with the plated layer may be deteriorated. The Si and Ti may be derived from the corrosion-resistant additive including the silicate compound and the titanium compound, and the P may be derived from an adhesion promoting agent including the polyphosphazene polymer compound.

The self-healing properties refer to a phenomenon in which corrosion may be inhibited by a reaction of a compound in a coated layer even when cracks are formed in the coated layer (the coated film) due to processing or other factors. In the present disclosure, the Si and Ti compounds in the composite resin-coated layer may be excellent in terms of the self-healing properties.

In addition, the composite resin-coated layer is preferably formed to a thickness of 0.1 to 2.0 μm (a thickness after drying).

The composite resin-coated steel plate for a fuel tank of the present disclosure may include: preparing a steel plate; forming a plated layer on at least one surface of the steel plate; and forming a composite resin-coated layer on an upper portion of the plated layer.

First, the steel plate is preferably the above-mentioned high-manganese cold-rolled steel plate, and it is preferable to use the electroplating method or the hot-dip plating method in forming the plated layer on at least one surface of the steel plate.

The electroplating method and the hot-dip plating method is preferably carried out from the application of ordinary conditions. For example, it is preferable to conduct the electroplating method of a Zn—Ni alloy under the following conditions. A Zn—Ni alloy electroplated layer may be formed by passing a previously prepared steel plate, containing zinc sulfate and nickel sulfate, at a current density of 120 A/dm$^3$ in a plating solution at a pH=1 and a temperature of 60° C. for 10 seconds. As a plating auxiliary additive in the plating solution, phenylsulfonic acid, ethylnaphthol, ethylnaphtholsulfonic acid, or the like, may be used.

It is preferable to form the composite resin-coated layer on an upper portion of the plated layer formed according to the above. In this case, the composite resin-coated layer may be formed using the composite resin composition according to the present disclosure.

More specifically, it is preferable that the composite resin-coated layer is formed by applying the above-mentioned composite resin composition on the plated layer, and then curing and drying at 120 to 200° C.

When the composite resin composition is applied, it may be treated in a reaction type or a coating type. The coating type treatment, excellent in terms of corrosion resistance, is preferable. As the above-mentioned coating method, various coating methods such as a roll coating method, a spraying method, a dipping method, and the like, may be used. In the present disclosure, the roll coating method is most preferable. The roll coating method may be applied to both a single surface or both surfaces of the plated steel plate.

Also, it is preferable that the composite resin composition is applied in a single surface adhesion amount of 0.1 to 2.0 g/m$^2$. When the single surface adhesion amount is less than 0.1 g/m$^2$, it may be difficult to secure the desired corrosion resistance, fuel resistance, and the like. When the single surface adhesion amount exceeds 2.0 g/m$^2$, the insulating property may become large to deteriorate the weldability. In addition, there may be a problem in that the thickness becomes excessively thick to deteriorate the adhesion with the plated layer.

After the application of the composite resin composition is completed, drying and curing at a specific temperature may be carried out in an oven by a hot air operation or an induction heating operation.

In this case, the drying and curing temperatures are preferably 120 to 200° C. based on a metal temperature (MT) the steel plate. When the drying and curing temperatures are less than 120° C., there may be a problem that the curing reaction between the components (organic and inorganic components) in the composition is insufficient, and it is difficult to secure corrosion resistance and fuel resistance. When the drying and curing temperatures exceed 200° C., there may be a problem that the crosslinking reaction of the curing agent excessively increases and the coated layer becomes hard, to deteriorate the workability.

Therefore, the composite resin-coated layer having a thickness of 0.1 to 2.0 μm may be formed by conducting completely drying and curing operations. When the thickness of the composite resin-coated layer is less than 0.1 μm, it may be difficult to secure sufficient corrosion resistance and fuel resistance. When the thickness exceeds 2.0 μm, the corrosion resistance and fuel resistance may be improved, but the insulation property may increase, to deteriorate the weldability.

The composite resin-coated steel plate of the present disclosure, including the plated layer and the composite resin-coated layer in sequence, may have an effect to be applied as a material for a hybrid vehicle fuel tank, which is required to be excellent in terms of corrosion resistance and fuel resistance, and to be excellent in terms of moldability to be molded into a more complicated shape.

MODE FOR INVENTION

Hereinafter, the present disclosure will be described in more detail with reference to examples. However, the description of these embodiments is intended only to illustrate the practice of the present disclosure, but the present disclosure is not limited thereto. The scope of the present disclosure may be determined by the matters set forth in the claims and the matters reasonably inferred therefrom.

EXAMPLE

Manufacturing of Composite Resin-Coated Steel Plate

Inventive Example 1-33

After preparing a high manganese cold-rolled steel plate having an alloy composition as shown in the following Table 1, as an example of the high elongation steel plate, and one of an electroplating method (Zn, Zn-10% Ni), a hot-dip plating method (GI, Zn-1.6% Al-1.6% Mg, Zn-2.5% Al-3.0% Mg, Al-8.0% Si) and a hot-dip galvannealing method (GA) was carried out to form a plated layer on a surface of the high manganese cold-rolled steel plate.

Next, the respective composite resin compositions shown in the following Table 2 were roll coated on the plated layer, and then dried and cured such that the temperature of the steel plate was 180° C. After completion of the drying and curing operations, the resultant steel plate was cooled to prepare a composite resin-coated steel plate having a dry coated film weight of 0.1 to 2 g/m$^2$. In this case, as a polymer resin, a urethane polymer (number average molecular weight: 25,000, Tg: 20° C.) was used. As a melamine-based curing agent, trimethoxymethyl melamine was used. As a silicate compound in a corrosion-resistant additive, lithium polysilicate was used. As a titanium compound therein, isopropyl ditriethanol aminotitanate was used. As a polyphosphazene polymer, a compound having a number average molecular weight of 20,000, and the substitution functional group (R=R'=—CH$_2$CH$_2$OCH$_2$CH$_2$OCH$_3$), as illustrated in (b) of FIG. 3, was used.

TABLE 1

| Example No. | Alloy Composition (wt %) Mn | C | S—Al | Plating Method | Plated Amount (g/m²) | Coated Amount of Composite Resin (g/m²) |
|---|---|---|---|---|---|---|
| *IE1 | 12 | 0.2 | 0.5 | Electroplating(Zn—Ni) | 30 | 0.5 |
| IE2 | 12 | 0.2 | 1.5 | Electroplating(Zn—Ni) | 30 | 1.0 |
| IE3 | 12 | 0.2 | 2.5 | Electroplating(Zn—Ni) | 30 | 1.5 |
| IE4 | 12 | 0.5 | 0.5 | Electroplating(Zn—Ni) | 30 | 0.5 |
| IE5 | 12 | 0.5 | 1.5 | Electroplating(Zn—Ni) | 30 | 1.0 |
| IE6 | 12 | 0.5 | 2.5 | Electroplating(Zn—Ni) | 30 | 1.5 |
| IE7 | 12 | 0.8 | 0.5 | Electroplating(Zn—Ni) | 30 | 0.5 |
| IE8 | 12 | 0.8 | 1.5 | Electroplating(Zn—Ni) | 30 | 1.0 |
| IE9 | 12 | 0.8 | 2.5 | Electroplating(Zn—Ni) | 30 | 1.5 |
| IE10 | 15 | 0.2 | 0.5 | Electroplating(Zn—Ni) | 30 | 0.5 |
| IE11 | 15 | 0.2 | 1.5 | Electroplating(Zn—Ni) | 30 | 1.0 |
| IE12 | 15 | 0.2 | 2.5 | Electroplating(Zn—Ni) | 30 | 1.5 |
| IE13 | 15 | 0.5 | 0.5 | Electroplating(Zn—Ni) | 30 | 0.5 |
| IE14 | 15 | 0.5 | 1.5 | Electroplating(Zn—Ni) | 30 | 1.0 |
| IE15 | 15 | 0.5 | 2.5 | Electroplating(Zn—Ni) | 30 | 1.5 |
| IE16 | 15 | 0.8 | 0.5 | Electroplating(Zn—Ni) | 30 | 0.5 |
| IE17 | 15 | 0.8 | 1.5 | Electroplating(Zn—Ni) | 30 | 1.0 |
| IE18 | 15 | 0.8 | 2.5 | Electroplating(Zn—Ni) | 30 | 1.5 |
| IE19 | 18 | 0.2 | 0.5 | Electroplating(Zn—Ni) | 30 | 0.5 |
| IE20 | 18 | 0.2 | 1.5 | Electroplating(Zn—Ni) | 30 | 1.0 |
| IE21 | 18 | 0.2 | 2.5 | Electroplating(Zn—Ni) | 30 | 1.5 |
| IE22 | 18 | 0.5 | 0.5 | Electroplating(Zn—Ni) | 30 | 0.5 |
| IE23 | 18 | 0.5 | 1.5 | Electroplating(Zn—Ni) | 30 | 1.0 |
| IE24 | 18 | 0.5 | 2.5 | Electroplating(Zn—Ni) | 30 | 1.5 |
| IE25 | 18 | 0.8 | 0.5 | Electroplating(Zn—Ni) | 30 | 0.5 |
| IE26 | 18 | 0.8 | 1.5 | Electroplating(Zn—Ni) | 30 | 1.0 |
| IE27 | 18 | 0.8 | 2.5 | Electroplating(Zn—Ni) | 30 | 1.5 |
| IE28 | 15 | 0.5 | 2.5 | Electroplating(Zn) | 30 | 1.0 |
| IE29 | 15 | 0.5 | 2.5 | Hot-Dip Galvanizing (GI) | 45 | 1.0 |
| IE30 | 15 | 0.5 | 2.5 | Hot-Dip galvannealing (GA) | 45 | 1.0 |
| IE31 | 15 | 0.5 | 2.5 | Hot-Dip Plating (Zn—1.6Al—1.6Mg) | 45 | 1.0 |
| IE32 | 15 | 0.5 | 2.5 | Hot-Dip Plating (Zn—2.5Al—3.0Mg) | 45 | 1.0 |
| IE33 | 15 | 0.5 | 2.5 | Hot-Dip Plating (Al—8.0Si) | 45 | 1.0 |

*IE: Inventive Example

TABLE 2

| | Composite Resin Composition (Solution, wt %) | | | | | |
|---|---|---|---|---|---|---|
| Example No. | Urethane Polymer | Trimethoxymethyl melamine | Lithium polysilicate | Isopropyl ditriethanol aminotitanate | Polyphosphazene | Solvent (water) |
| *IE1 | 50 | 11 | 4 | 3 | 4 | 28 |
| IE2 | 39 | 7 | 11 | 7 | 7 | 29 |
| IE3 | 44 | 4 | 7 | 5 | 11 | 29 |
| IE4 | 53 | 7 | 4 | 3 | 4 | 29 |
| IE5 | 41 | 11 | 7 | 5 | 7 | 29 |
| IE6 | 42 | 7 | 5 | 7 | 9 | 30 |
| IE7 | 53 | 5 | 4 | 5 | 4 | 29 |
| IE8 | 44 | 9 | 7 | 3 | 7 | 30 |
| IE9 | 42 | 7 | 9 | 7 | 5 | 30 |
| IE10 | 55 | 4 | 4 | 5 | 4 | 28 |
| IE11 | 43 | 7 | 11 | 3 | 7 | 29 |
| IE12 | 39 | 11 | 7 | 3 | 11 | 29 |
| IE13 | 48 | 11 | 4 | 5 | 4 | 28 |
| IE14 | 46 | 4 | 7 | 7 | 7 | 29 |
| IE15 | 37 | 7 | 11 | 5 | 11 | 29 |
| IE16 | 48 | 7 | 9 | 3 | 4 | 29 |
| IE17 | 48 | 4 | 7 | 5 | 7 | 29 |
| IE18 | 39 | 11 | 4 | 7 | 11 | 28 |
| IE19 | 49 | 5 | 7 | 5 | 4 | 30 |
| IE20 | 53 | 4 | 4 | 3 | 7 | 29 |
| IE21 | 32 | 11 | 11 | 7 | 11 | 28 |
| IE22 | 46 | 7 | 7 | 3 | 7 | 30 |
| IE23 | 49 | 7 | 5 | 5 | 4 | 30 |
| IE24 | 53 | 4 | 4 | 7 | 4 | 28 |
| IE25 | 44 | 4 | 9 | 7 | 7 | 29 |
| IE26 | 43 | 11 | 7 | 3 | 7 | 29 |

TABLE 2-continued

| | Composite Resin Composition (Solution, wt %) | | | | | |
|---|---|---|---|---|---|---|
| Example No. | Urethane Polymer | Trimethoxymethyl melamine | Lithium polysilicate | Isopropyl ditriethanol aminotitanate | Polyphosphazene | Solvent (water) |
| IE27 | 37 | 7 | 11 | 5 | 11 | 29 |
| IE28 | 42 | 4 | 7 | 7 | 11 | 29 |
| IE29 | 46 | 7 | 11 | 3 | 4 | 29 |
| IE30 | 44 | 11 | 4 | 5 | 7 | 29 |
| IE31 | 41 | 7 | 7 | 5 | 11 | 29 |
| IE32 | 42 | 4 | 11 | 7 | 7 | 29 |
| IE33 | 53 | 7 | 4 | 3 | 4 | 29 |

*IE: Inventive Example

Comparative Example 1-7

A conventional carbon steel plate having an alloy composition as shown in the following Table 3 was prepared, and one of an electroplating method (Zn, Zn-10% Ni), a hot-dip plating method (GI, Zn-1.6% Al-1.6% Mg, Zn-3.0% Al-2.8% Mg, Al-8.0% Si) and a hot-dip galvannealing method (GA) was carried out to form a plated layer on a surface of the carbon steel plate.

Next, the respective composite resin compositions shown in the following Table 4 were roll coated on the plated layer, and then dried and cured such that the temperature of the steel plate was 180° C. After completion of the drying and curing operations, the resultant steel plate was cooled to prepare a composite resin-coated steel plate having a dry coated film weight of 0.1 to 2 g/m². In this case, a polymer resin, a melamine curing agent, a corrosion-resistant additive, and a polyphosphazene polymer compound of the composite resin composition were the same as those used in the production of the composite resin-coated steel plates of the above Inventive Examples.

Comparative Examples 8-10

After preparing a high manganese cold-rolled steel plate having an alloy composition as shown in the following Table 3, one of an electroplating method (Zn-10% Ni) and a hot-dip galvannealing method (GA) was carried out to form a plated layer on a surface of the high manganese cold-rolled steel plate.

Next, the respective composite resin compositions shown in the following Table 4 were roll coated on the plated layer, and then dried and cured such that the temperature of the steel plate was 180° C. After completion of the drying and curing operations, the resultant steel plate was cooled to prepare a composite resin-coated steel plate having a dry coated film weight of 0.1 to 2 g/m². In this case, a polymer resin, a melamine curing agent, and a corrosion-resistant additive of the composite resin composition were the same as those used in the production of the composite resin-coated steel plates of the above Inventive Examples. As an adhesion promoting agent, a zinc-phosphate-based compound was used instead of a polyphosphazene polymer compound.

TABLE 3

| Example No. | Alloy Composition (wt %) | | | Plating Method | Plated Amount (g/m²) | Coated Amount of Composite Resin (g/m²) |
|---|---|---|---|---|---|---|
| | Mn | C | S—Al | | | |
| **CE1 | 3.0 | 0.3 | 0.5 | Electroplating (Zn—Ni) | 20 | 1.0 |
| CE2 | 3.0 | 0.3 | 0.5 | Electroplating (Zn) | 20 | 1.0 |
| CE3 | 3.0 | 0.3 | 0.5 | Hot-Dip Galvanizing (GI) | 45 | 1.0 |
| CE4 | 3.0 | 0.3 | 0.5 | Hot-Dip galvannealing (GA) | 45 | 1.0 |
| CE5 | 3.0 | 0.3 | 0.5 | Hot-Dip Plating (Zn—1.6Al—1.6Mg) | 45 | 1.0 |
| CE6 | 3.0 | 0.3 | 0.5 | Hot-Dip Plating (Zn—3.0Al—2.8Mg) | 45 | 1.0 |
| CE7 | 3.0 | 0.3 | 0.5 | Hot-Dip Plating (Al—8Si) | 45 | 1.0 |
| CE8 | 15 | 0.2 | 0.5 | Electroplating (Zn—Ni) | 30 | 0.5 |
| CE9 | 18 | 0.2 | 1.5 | Electroplating (Zn—Ni) | 30 | 1.0 |
| CE10 | 15 | 0.5 | 2.5 | Hot-Dip galvannealing (GA) | 45 | 1.0 |

**CE: Comparative Example

TABLE 4

| | Composite Resin Composition (Solution, wt %) | | | | | | |
|---|---|---|---|---|---|---|---|
| Example No. | Urethane Polymer | Trimethoxymethyl melamine | Lithium polysilicate | Isopropyl ditriethanol aminotitanate | Polyphosphazene | Zinc-Phosphate-based | Solvent (water) |
| **CE1 | 46 | 7 | 7 | 3 | 7 | — | 30 |
| CE2 | 46 | 7 | 7 | 3 | 7 | — | 30 |
| CE3 | 46 | 7 | 7 | 3 | 7 | — | 30 |
| CE4 | 46 | 7 | 7 | 3 | 7 | — | 30 |

TABLE 4-continued

| | Composite Resin Composition (Solution, wt %) | | | | | | |
|---|---|---|---|---|---|---|---|
| Example No. | Urethane Polymer | Trimethoxymethyl melamine | Lithium polysilicate | Isopropyl ditriethanol aminotitanate | Polyphosphazene | Zinc-Phosphate-based | Solvent (water) |
| CE5 | 46 | 7 | 7 | 3 | 7 | — | 30 |
| CE6 | 46 | 7 | 7 | 3 | 7 | — | 30 |
| CE7 | 46 | 7 | 7 | 3 | 7 | — | 30 |
| CE8 | 46 | 7 | 7 | 3 | — | 7 | 30 |
| CE9 | 46 | 7 | 7 | 3 | — | 7 | 30 |
| CE10 | 46 | 7 | 7 | 3 | — | 7 | 30 |

**CE: Comparative Example

Property Evaluation

First, in order to evaluate the strength and ductility of each of the composite resin-coated steel plates prepared above, specimens were prepared in accordance with JIS No. 5 standard, and were evaluated using a universal testing machine. The results are shown in the following Table 5.

A composition of the coated layer of the thus produced composite resin-coated steel plate was evaluated, and the results are shown in the following Table 5. In this case, the content (% by weight) of each component was described on the basis of 100% by weight of solids in the state of the dry film from which the solvent (water) and the cured product were removed in each coating composition used for producing the composite resin-coated steel plate.

In order to evaluate the properties of each of the composite resin-coated steel plates manufactured as described above, evaluation was made on corrosion resistance, fuel resistance to gasoline and diesel fuel, seam weldability, workability, and film adhesion, and the results thereof are shown in the following Table 6.

The corrosion resistance evaluation was evaluated by a Cyclic Corrosion Test (CCT). As a single cycle, including conducting a salt pray test(Concentration 5%, spray pressure of 1 kg/cm² at 35° C.) for 5 hours under a relative humidity of 95%, drying the specimens for 2 hours at a relative humidity of 30% at a temperature of 70° C., and treating the specimens for 3 hours at a relative humidity of 95% at a temperature of 50° C., 100 cycles were carried repeatedly out on the specimens, and then evaluated by area of occurrence of red rust on the surface of the steel plate. The evaluation criteria thereon were as follows, and the evaluation results are shown in Table 6 below.

⊚: Corrosion area being 0%, 0: Corrosion area being not more than 5%

Δ: Corrosion area exceeding 5% and 30% or less, X: Corrosion area exceeding 30%

A fuel resistance test was evaluated by an accelerated fuel resistance test on gasoline, diesel, deteriorated gasoline (including 5% H$_2$O, 100 ppm formic acid), and deteriorated diesel (including 5% H$_2$O and 100 ppm formic acid). The specimens were evaluated, after conducting a cup process (blank size: 115×115 mm; cup size, punch diameter 50 mm, drawing height 30 mm, punch R=Die R=6R), filling a cup with fuel, covering and fixing the same with a fluorine O-ring and a glass plate.

In the gasoline fuel composition, pure water and formic acid were added to 30 ml of gasoline, respectively, and allowed to stand for 1,000 hours while shaking at 60° C. at a rate of 60 cycles per minute. Then, a corrosion state of this steel plate was evaluated.

In the diesel fuel composition, pure water and formic acid were added to 30 ml of diesel, and each of them was allowed to stand for 8 weeks while shaking at a rate of 60 cycles per minute at a temperature of 90° C. Then, a corrosion state of this steel plate was evaluated.

The fuel resistance evaluation criteria were as follows, and the evaluation results are shown in Table 6 below. In a portion of Examples, degree of corrosion was visually confirmed, and the results are shown in FIG. 4.

⊚: Corrosion area being 0%, ○: Corrosion area being not more than 5%, Δ: Corrosion area exceeding 5% and 30% or less, X: Corrosion area exceeding 30%

The seam weldability was measured by using Ironman (Inverter DC Seam Welding Machine) with no spatter at 4 kN of compression force, 6 mpm of welding speed, 33 ms of welding time, and 10 ms of rest time, while maintaining constant strength.

The seam weldability was evaluated by measuring liquid metal embrittlement (LME) length through the cross-sectional structure analysis of a welded joint.

The evaluation criteria were as follows, and the evaluation results are shown in Table 6 below. Also, the measured LME lengths for a portion of the Examples were graphed and shown in FIG. 5.

⊚: Less than 10 mm, ○: 10 mm or more and less than 20 mm, Δ: 20 mm or more

The workability was evaluated by the limiting dome height test using a plane strain stretch tester (PSST). The test conditions were as follows: punch diameter: 100 mm, blank holding force (BHF): 20 ton, and punch speed: 200 mm/min, and this test was carried out in a non-lubricated state, by molding the specimens until their fracture, and then evaluating the same based on a molded height.

The evaluation criteria were as follows, and the evaluation results are shown in Table 6 below.

⊚: 500 mm or more, ○: 30 mm or more and less than 500 mm, Δ: less than 30 mm

The film adhesion was evaluated by measuring the blackness of a processed portion. The degree of blackness of the film was evaluated after performing a reciprocating rubbing operation in 10 times, 20 times, and 30 times while pressing the weight of the steel tip at a weight of 3.3 Kg by a blackness meter.

Figures 5, 6:
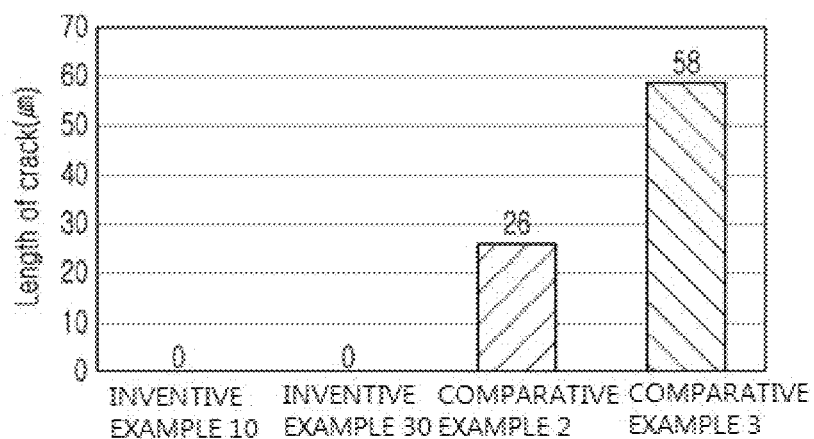
FIG. 5 shows evaluation results of seam weldability of inventive examples according to an embodiment of the present disclosure, and a comparative example (y-axis: measurement of LME length of seam welding portion).
FIG. 6 shows evaluation results of film adhesion of inventive examples according to an embodiment of the present disclosure, and a comparative example.

The evaluation criteria were as follows, and the evaluation results are shown in Table 6 below. In a portion of Examples, degree of blackening by the number of each of the rubbing operation was visually confirmed, and the results are shown in FIG. 6.

⊚: 10, 20, and 30 times being good, ○: 10 and 20 times being good, Δ: 10, 20, and 30 times being poor

TABLE 5

| Example No. | Mechanical properties | | Coated Layer Composition (Solid Content 100%, Dry Weight %) | | | | | |
|---|---|---|---|---|---|---|---|---|
| | Tensile Strength (MPa) | Elongation (%) | Urethane Polymer | Trimethoxymethyl melamine | Lithium polysilicate | Isopropyl ditriethanol aminotitanate | Polyphosphazene | Zinc-Phosphate-based |
| *IE1 | 850 | 56 | 71 | 15 | 5 | 4 | 5 | — |
| IE2 | 850 | 56 | 55 | 10 | 15 | 10 | 10 | — |
| IE3 | 850 | 56 | 63 | 5 | 10 | 7 | 15 | — |
| IE4 | 850 | 56 | 76 | 10 | 5 | 4 | 5 | — |
| IE5 | 850 | 56 | 58 | 15 | 10 | 7 | 10 | — |
| IE6 | 850 | 56 | 60 | 10 | 7.5 | 10 | 12.5 | — |
| IE7 | 850 | 56 | 75.5 | 7.5 | 5 | 7 | 5 | — |
| IE8 | 850 | 56 | 63.5 | 12.5 | 10 | 4 | 10 | — |
| IE9 | 850 | 56 | 60 | 10 | 12.5 | 10 | 7.5 | — |
| IE10 | 960 | 60 | 78 | 5 | 5 | 7 | 5 | — |
| IE11 | 960 | 60 | 61 | 10 | 15 | 4 | 10 | — |
| IE12 | 960 | 60 | 56 | 15 | 10 | 4 | 15 | — |
| IE13 | 960 | 60 | 68 | 15 | 5 | 7 | 5 | — |
| IE14 | 960 | 60 | 65 | 5 | 10 | 10 | 10 | — |
| IE15 | 960 | 60 | 53 | 10 | 15 | 7 | 15 | — |
| IE16 | 960 | 60 | 68.5 | 10 | 12.5 | 4 | 5 | — |
| IE17 | 960 | 60 | 68 | 5 | 10 | 7 | 10 | — |
| IE18 | 960 | 60 | 55 | 15 | 5 | 10 | 15 | — |
| IE19 | 980 | 62 | 70.5 | 7.5 | 10 | 7 | 5 | — |
| IE20 | 980 | 62 | 76 | 5 | 5 | 4 | 10 | — |
| IE21 | 980 | 62 | 45 | 15 | 15 | 10 | 15 | — |
| IE22 | 980 | 62 | 66 | 10 | 10 | 4 | 10 | — |
| IE23 | 980 | 62 | 70.5 | 10 | 7.5 | 7 | 5 | — |
| IE24 | 980 | 62 | 75 | 5 | 5 | 10 | 5 | — |
| IE25 | 980 | 62 | 62.5 | 5 | 12.5 | 10 | 10 | — |
| IE26 | 980 | 62 | 61 | 15 | 10 | 4 | 10 | — |
| IE27 | 980 | 62 | 53 | 10 | 15 | 7 | 15 | — |
| IE28 | 960 | 60 | 60 | 5 | 10 | 10 | 15 | — |
| IE29 | 960 | 60 | 66 | 10 | 15 | 4 | 5 | — |
| IE30 | 960 | 60 | 63 | 15 | 5 | 7 | 10 | — |
| IE31 | 960 | 60 | 58 | 10 | 10 | 7 | 15 | — |
| IE32 | 960 | 60 | 60 | 5 | 15 | 10 | 10 | — |
| IE33 | 960 | 60 | 76 | 10 | 5 | 4 | 5 | — |
| **CE1 | 280 | 42 | 66 | 10 | 10 | 4 | 10 | — |
| CE2 | 280 | 42 | 66 | 10 | 10 | 4 | 10 | — |
| CE3 | 280 | 42 | 66 | 10 | 10 | 4 | 10 | — |
| CE4 | 280 | 42 | 66 | 10 | 10 | 4 | 10 | — |
| CE5 | 280 | 42 | 66 | 10 | 10 | 4 | 10 | — |
| CE6 | 280 | 42 | 66 | 10 | 10 | 4 | 10 | — |
| CE7 | 280 | 42 | 66 | 10 | 10 | 4 | 10 | — |
| CE8 | 960 | 60 | 66 | 10 | 10 | 4 | — | 10 |
| CE9 | 980 | 62 | 66 | 10 | 10 | 4 | — | 10 |
| CE10 | 960 | 60 | 66 | 10 | 10 | 4 | — | 10 |

*IE: Inventive Example
**CE: Comparative Example

TABLE 6

| Example No. | CCT Corrosion resistance | Fuel Resistance | | | | Seam Weldability | Workability | Film Adhesion |
|---|---|---|---|---|---|---|---|---|
| | | Gasoline | Diesel | Deteriorated Gasoline | Deteriorated Diesel | | | |
| *IE1 | ⊚ | ⊚ | ⊚ | ⊚ | ⊚ | ⊚ | ⊚ | ⊚ |
| IE2 | ⊚ | ⊚ | ⊚ | ⊚ | ⊚ | ⊚ | ⊚ | ⊚ |
| IE3 | ⊚ | ⊚ | ⊚ | ⊚ | ⊚ | ⊚ | ⊚ | ⊚ |
| IE4 | ⊚ | ⊚ | ⊚ | ⊚ | ⊚ | ⊚ | ⊚ | ⊚ |
| IE5 | ⊚ | ⊚ | ⊚ | ⊚ | ⊚ | ⊚ | ⊚ | ⊚ |
| IE6 | ⊚ | ⊚ | ⊚ | ⊚ | ⊚ | ⊚ | ⊚ | ⊚ |
| IE7 | ⊚ | ⊚ | ⊚ | ⊚ | ⊚ | ⊚ | ⊚ | ⊚ |
| IE8 | ⊚ | ⊚ | ⊚ | ⊚ | ⊚ | ⊚ | ⊚ | ⊚ |
| IE9 | ⊚ | ⊚ | ⊚ | ⊚ | ⊚ | ⊚ | ⊚ | ⊚ |
| IE10 | ⊚ | ⊚ | ⊚ | ⊚ | ⊚ | ⊚ | ⊚ | ⊚ |
| IE11 | ⊚ | ⊚ | ⊚ | ⊚ | ⊚ | ⊚ | ⊚ | ⊚ |
| IE12 | ⊚ | ⊚ | ⊚ | ⊚ | ⊚ | ⊚ | ⊚ | ⊚ |
| IE13 | ⊚ | ⊚ | ⊚ | ⊚ | ⊚ | ⊚ | ⊚ | ⊚ |
| IE14 | ⊚ | ⊚ | ⊚ | ⊚ | ⊚ | ⊚ | ⊚ | ⊚ |
| IE15 | ⊚ | ⊚ | ⊚ | ⊚ | ⊚ | ⊚ | ⊚ | ⊚ |
| IE16 | ⊚ | ⊚ | ⊚ | ⊚ | ⊚ | ⊚ | ⊚ | ⊚ |

TABLE 6-continued

| Example No. | CCT Corrosion resistance | Fuel Resistance Gasoline | Diesel | Deteriorated Gasoline | Deteriorated Diesel | Seam Weldability | Workability | Film Adhesion |
|---|---|---|---|---|---|---|---|---|
| IE17 | ⊚ | ⊚ | ⊚ | ⊚ | ⊚ | ⊚ | ⊚ | ⊚ |
| IE18 | ⊚ | ⊚ | ⊚ | ⊚ | ⊚ | ⊚ | ⊚ | ⊚ |
| IE19 | ⊚ | ⊚ | ⊚ | ⊚ | ⊚ | ⊚ | ⊚ | ⊚ |
| IE20 | ⊚ | ⊚ | ⊚ | ⊚ | ⊚ | ⊚ | ⊚ | ⊚ |
| IE21 | ⊚ | ⊚ | ⊚ | ⊚ | ⊚ | ⊚ | ⊚ | ⊚ |
| IE22 | ⊚ | ⊚ | ⊚ | ⊚ | ⊚ | ⊚ | ⊚ | ⊚ |
| IE23 | ⊚ | ⊚ | ⊚ | ⊚ | ⊚ | ⊚ | ⊚ | ⊚ |
| IE24 | ⊚ | ⊚ | ⊚ | ⊚ | ⊚ | ⊚ | ⊚ | ⊚ |
| IE25 | ⊚ | ⊚ | ⊚ | ⊚ | ⊚ | ⊚ | ⊚ | ⊚ |
| IE26 | ⊚ | ⊚ | ⊚ | ⊚ | ⊚ | ⊚ | ⊚ | ⊚ |
| IE27 | ⊚ | ⊚ | ⊚ | ⊚ | ⊚ | ⊚ | ⊚ | ⊚ |
| IE28 | ○ | ⊚ | ⊚ | ○ | ○ | ⊚ | ⊚ | ⊚ |
| IE29 | ○ | ⊚ | ⊚ | ○ | ○ | ○ | ⊚ | ⊚ |
| IE30 | ○ | ⊚ | ⊚ | ○ | ○ | ⊚ | ⊚ | ⊚ |
| IE31 | ⊚ | ⊚ | ⊚ | ⊚ | ⊚ | ○ | ⊚ | ⊚ |
| IE32 | ⊚ | ⊚ | ⊚ | ⊚ | ⊚ | ○ | ⊚ | ⊚ |
| IE33 | ⊚ | ⊚ | ⊚ | ⊚ | ⊚ | ○ | ⊚ | ⊚ |
| **CE1 | ⊚ | ⊚ | ⊚ | ⊚ | ⊚ | ⊚ | △ | △ |
| CE2 | ○ | ○ | ○ | ○ | ○ | ○ | △ | △ |
| CE3 | ○ | ○ | ○ | ○ | ○ | △ | △ | △ |
| CE4 | ○ | ○ | ○ | ○ | ○ | ⊚ | △ | △ |
| CE5 | ⊚ | ⊚ | ⊚ | ⊚ | ⊚ | △ | △ | △ |
| CE6 | ⊚ | ⊚ | ⊚ | ⊚ | ⊚ | △ | △ | △ |
| CE7 | ⊚ | ⊚ | ⊚ | ⊚ | ⊚ | ○ | △ | △ |
| CE8 | ○ | ⊚ | ⊚ | ⊚ | ⊚ | ⊚ | ○ | △ |
| CE9 | ○ | ⊚ | ⊚ | ⊚ | ⊚ | ⊚ | ○ | △ |
| CE10 | △ | ⊚ | ⊚ | ○ | ○ | ⊚ | ○ | △ |

*IE: Inventive Example
**CE: Comparative Example

As shown in Table 6, in the cases of Examples 1 to 33 coated with the composite resin composition of the present disclosure while using a high-manganese cold-rolled steel plate, it was confirmed that excellent properties were exhibited in various plating methods.

In the cases of Comparative Examples 1 to 7 in which a high-manganese cold-rolled steel plate was not used, it was confirmed that not only the strength and ductility of the steel plate were not satisfactory, but also weldability, workability and film adhesion were deteriorated.

Also, in the cases of Comparative Examples 8 to 10 using a different composite resin composition from the present disclosure (adhesion promoting agent different from the present disclosure) while using a high-manganese cold-rolled steel plate, the coating film adhesion was poor in all of the cases.

As shown in FIG. 4, it was confirmed that the corrosion resistance, even with deteriorated gasoline and the deteriorated diesel, was excellent in the cases of Inventive Examples 10, 20 and 30, while the occurrence of corrosion was observed in the case of Comparative Example 2.

As illustrated in FIG. 5, it was confirmed that, in the cases of Inventive Examples 10 and 30, the LME length after welding was 0 μm, and no molten metal brittleness phenomenon occurred, while in the cases of Comparative Examples 2 and 3, the LME lengths after welding were 26 μm and 58 μm, respectively, and seam weldability was very deteriorated.

As shown in FIG. 6, it was confirmed that, in the cases of Inventive Examples 10, 20, and 30, blackening occurred finely when the rubbing frequency was 20 times or more, while in the case of Comparative Example 8, considerable blackening occurred when the rubbing frequency was 10 times or more.

In order to simulate high elongation of the film (the composite resin-coated layer), the following results are obtained: After conducting a bending processing at 180° OT on 0%, 10%, and 20% tensile processed portions, the appearance was evaluated. The evaluation criteria were as follows, and the results are shown in FIG. 7.

Figure 7:
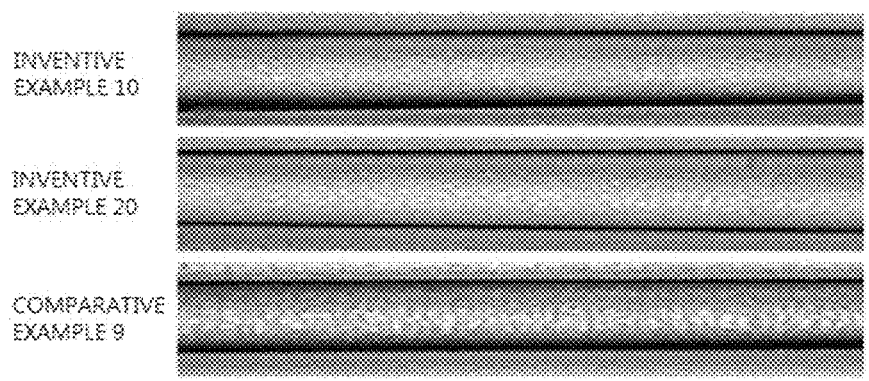
FIG. 7 shows appearance observation results of a bending processing portion of inventive examples according to an embodiment of the present disclosure, and a comparative example.

⊚: 20% elongation being good ○: 10% elongation being good
△: 0% elongation being good As shown in FIG. 7, in the cases of Inventive Examples 10 and 20, no cracking occurred in the film, or no peeling occurred at the time of a tape test, during an OT bending process on a 20% elongation processed portion, while in the case of Comparative Example 9, cracks occurred in the film.

The invention claimed is:

1. A composite resin composition for steel plates for a fuel tank, comprising:
   30 to 65% by weight of a polymer resin;
   1 to 15% by weight of a curing agent;
   2 to 20% by weight of a corrosion-resistant additive;
   1 to 15% by weight of an adhesion promoting agent comprising a polyphosphazene polymer compound; and
   a residual solvent.

2. The composite resin composition according to claim 1, wherein the polyphosphazene polymer compound has a number average molecular weight of 5,000 to 50,000, and has one or more substitution functional groups of alkyl, substituted alkyl, aryl, and substituted aryl.

3. The composite resin composition according to claim 1, wherein
   the polymer resin is one or more selected from urethane polymer, acrylic polymer, ester polymer and epoxy-urethane copolymer, wherein the polymer resin has a number average molecular weight of 5,000 to 50,000 and a Tg of 10 to 50° C.

4. The composite resin composition according to claim 1, wherein the curing agent is one or more of a melamine-based curing agent, an aziridine curing agent, and an isocyanate curing agent.

5. The composite resin composition according to claim 4, wherein the melamine-based curing agent is one or more of melamine, butoxymethyl melamine, hexamethoxymethyl melamine and trimethoxymethyl melamine.

6. The composite resin composition according to claim 1, wherein the corrosion-resistant additive is a mixture of a silicate compound and a titanium compound,
wherein the silicate compound and the titanium compound are included in a weight ratio of 0.5:1 to 4:1.

7. The composite resin composition according to claim 6, wherein the silicate compound is one or more of lithium polysilicate, sodium polysilicate, potassium polysilicate, and colloidal silica, and
the titanium compound is one or more of titanium carbonate, isopropyl ditriethanol aminotitanate, titanium lactic acid chelate, and titanium acetylacetonate.

8. A composite resin-coated steel plate for a fuel tank, comprising:
a steel plate;
a plated layer formed on at least one surface of the steel plate; and
a composite resin-coated layer formed on the plated layer,
wherein the composite resin-coated layer comprises 40 to 85% by weight of a polymer resin, 3 to 20% by weight of a curing agent, 5 to 25% by weight of a corrosion-resistant additive, and 3 to 20% by weight of an adhesion promoting agent comprising a polyphosphazene polymer compound,
wherein the steel plate has a tensile strength of 800 MPa or more and an elongation of 35% or more.

9. The composite resin-coated steel plate according to claim 8, wherein the polyphosphazene polymer compound has a number average molecular weight of 5,000 to 50,000, and has one or more substitution functional groups of alkyl, substituted alkyl, aryl, and substituted aryl.

10. The composite resin-coated steel plate according to claim 8, wherein the composite resin-coated layer is formed to a thickness of 0.1 to 2.0 μm.

11. The composite resin-coated steel plate according to claim 8, wherein the polymer resin is one or more selected from urethane polymer, acrylic polymer, ester polymer and epoxy-urethane copolymer, wherein the polymer resin has a number average molecular weight of 5,000 to 50,000 and a Tg of 10 to 50° C.

12. The composite resin-coated steel plate according to claim 8, wherein the curing agent is one or more of a melamine-based curing agent, an aziridine curing agent, and an isocyanate curing agent.

13. The composite resin-coated steel plate according to claim 8, wherein the corrosion-resistant additive comprises a silicate compound and a titanium compound in a weight ratio of 0.5:1 to 4:1.

14. The composite resin-coated steel plate according to claim 13, wherein the composite resin-coated layer has a weight ratio {([Si]+[Ti])/[P]} between Si, Ti, and P of 0.5 to 1.5,
wherein the [Si] is weight derived from the corrosion-resistant additive including the silicate compound, the [Ti] is weight derived from the corrosion-resistant additive including the titanium compound, and the [P] is weight derived from the adhesion promoting agent including the polyphosphazene polymer compound.

15. The composite resin-coated steel plate according to claim 13, wherein the silicate compound is one or more of lithium polysilicate, sodium polysilicate, potassium polysilicate, and colloidal silica, and
the titanium compound is one or more of titanium carbonate, isopropyl ditriethanol aminotitanate, titanium lactic acid chelate, and titanium acetylacetonate.

16. The composite resin-coated steel plate according to claim 8, wherein the steel plate comprises, by weight %, 0.2 to 1.0% of carbon (C), 12 to 20% of manganese (Mn), 0.5 to 2.5% of solid solution aluminum (S—Al), balance Fe, and other unavoidable impurities.

17. The composite resin-coated steel plate according to claim 8,
wherein the plated layer is an electroplated layer or a hot-dip plated layer,
wherein the electroplated layer is a zinc plated layer or a zinc-nickel alloy plated layer, and
the hot-dip plated layer is one of a hot-dip zinc plated layer, an alloyed hot-dip zinc plated layer, a zinc-aluminum-magnesium alloy plated layer, and an aluminum-silicon alloy plated layer.

18. The composite resin-coated steel plate according to claim 17, wherein the electroplated layer is formed in a single surface adhesion amount of 5 to 40 g/m$^2$, and
the hot-dip plated layer is formed in a single surface adhesion amount of 20 to 60 g/m$^2$.

19. A manufacturing method for a composite resin-coated steel plate, comprising:
preparing a steel plate;
forming a plated layer on at least one surface of the steel plate;
applying a composite resin composition for a fuel tank steel plate to an upper portion of the plated layer; and
drying the applied composite resin composition at a temperature of 120 to 200° C.,
wherein the composite resin composition for a fuel tank steel plate comprises
30 to 65% by weight of a polymer resin;
1 to 15% by weight of a curing agent;
2 to 20% by weight of a corrosion-resistant additive;
1 to 15% by weight of an adhesion promoting agent comprising a polyphosphazene polymer compound; and
a residual solvent.

20. The method according to claim 19, wherein the steel plate comprises, by weight, 0.2 to 1.0% of carbon (C), 12 to 20% of manganese (Mn), 0.5 to 2.5% of solid solution aluminum (S—Al), residual iron (Fe), and other unavoidable impurities, and is a high manganese cold-rolled steel plate having a tensile strength of 800 MPa or more and an elongation of 35% or more.

* * * * *